(No Model.)
D. GESSNER.
CLOTH PRESSING MACHINE.
No. 387,293. Patented Aug. 7, 1888.
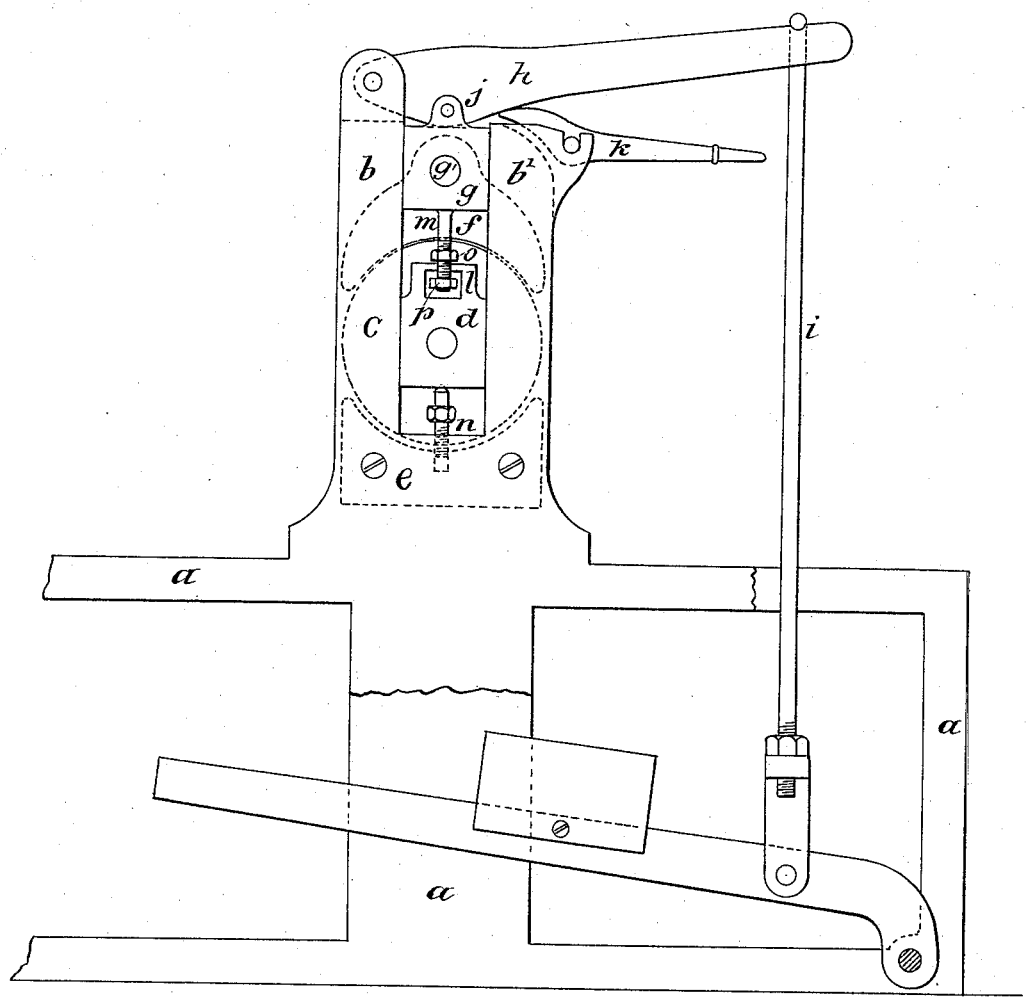
Witnesses.
D. H. Driscoll.
R. J. Cody.
Inventor:
David Gessner
by Gifford & Brown.
Attys.

United States Patent Office.

DAVID GESSNER, OF WORCESTER, MASSACHUSETTS.

CLOTH-PRESSING MACHINE.

SPECIFICATION forming part of Letters Patent No. 387,293, dated August 7, 1888.

Application filed March 20, 1886. Renewed June 16, 1888. Serial No. 277,351. (No model.)

*To all whom it may concern:*

Be it known that I, DAVID GESSNER, of Worcester, county of Worcester, State of Massachusetts, have invented a new and useful Improvement in Cloth-Pressing Machines, of which the following is a specification.

The invention which is the subject of this application is an improvement on a machine similar to that described in Patent No. 193,193, dated July 17, 1877, to Springborn and Baush, but preferably having two bed-plates, one above and the other below the cylinder, in lieu of the bed-plate and cylinder shown in said patent.

This invention consists in the provision of means whereby the cylinder and either bed-plate can be adjusted relatively to one another, so that the cylinder and other bed-plate can be operated while substantially no pressure is exerted by the first bed-plate.

In the drawing I have shown the arrangement of cylinder and bed-plates with reference to each other and to the bed of the machine and the method of sustaining their journals.

*a* is the frame of the machine, extending upward in the two branches *b b'*.

*c* is the cylinder, which is journaled in the box *d*, which is adapted to slide up and down between the two branches of the frame. Below the cylinder the bed-plate *e* is supported in the frame. Above the cylinder is the second bed-plate, *f*, which is journaled in the boxes *g* at *g'*. These boxes slide up and down between the branches of the frame above the boxes *d*. Suitable gearing (not shown,) is employed for turning the cylinder *c*.

Pressure is exerted on the top of bed-plate *f* by a lever, *h*, pivoted at one end to the frame and at the other connected by the rod *i* to a weighted lever, as shown. This lever *h* is pivotally secured to ears *j* on the box *g*, and it is also raised by the hand-lever *k*, which at one end acts on it as a cam.

*l* is a stirrup on top of the box *d*, which is connected with the box *g* by a stud, *m*, depending from the box *g*, and which passes loosely through a hole in the stirrup *l*, and is provided with a nut, *p*, at its lower end, so as to serve as a lifter. The nut on this stud *m* is so adjusted that the bed-plate *f* may be lifted slightly before the cylinder begins to be lifted.

Between the box *d* and the frame is interposed a set-screw, *n*, one at each end of the machine. These set-screws may be so adjusted as to remove the pressure from between the cylinder *c* and bed-plates *e*, or allow pressure to be exerted there. With one adjustment of the set-screw *n* the pressure which is applied to the upper bed-plate is transmitted through the cylinder to the lower bed-plate, and any goods passing through the machine are pressed both at the lower and upper bed-plates. With another adjustment of the set-screw *n* the pressure applied to the upper bed-plate is transmitted to the cylinder and from the sliding boxes, in which the cylinder is mounted, through the set-screw *n* to the frame, which serves as an adjustable rest. Under these circumstances no pressure is exerted on the goods by the lower bed-plate, but only by the upper one.

*o* is a second nut on the stud *l*. By the downward adjustment of this nut the upper bed-plate may be raised from the cylinder, so that when the pressure is brought to bear on the sliding boxes of the bed-plate, the pressure instead of being transmitted through the cloth to the cylinder, is transmitted through the stud *m* with its nut *o*, which serves as an adjustable rest and stirrup, *l*. Thus the cloth may be relieved of pressure between the cylinder and upper bed-plate while it is still being subjected to pressure between the cylinder and lower bed-plate. Thus by the adjustments of the nuts *o* or set-screws *n* the pressure may be relieved from either bed-plate without effecting the operation of the other.

As the specific means for relieving the pressure between the cylinder and the bed-plate, I have shown the set-screw *n* and nut *o*; but it is obvious that other mechanical devices might be substituted for accomplishing the same result which would suggest themselves to a skilled mechanic and be practically equivalents of those shown.

The advantages of this improvement are that in case one bed-plate becomes damaged in any way or in case the pressure of only one bed-plate is required the machine may be run with practically no pressure on either one of the bed-plates, while all the remaining parts perform their usual functions.

I claim—

In a cloth-pressing machine, in combination, the cylinder $c$, two bed-plates, $e$ and $f$, movable bearing-supports $g$ and $d$, an adjustable rest sustaining the bearing-supports $d$, and an adjustable-rest interposed between the bearing-supports $d$ and $g$, whereby the pressure can be relieved between the cylinder and either bed-plate, substantially as described.

DAVID GESSNER.

Witnesses:
LIVINGSTON GIFFORD,
R. J. CODY.